US012585506B2

(12) United States Patent
Agrawal et al.

(10) Patent No.: US 12,585,506 B2
(45) Date of Patent: Mar. 24, 2026

(54) SYSTEM AND METHOD FOR DETERMINATION OF MODEL FITNESS AND STABILITY FOR MODEL DEPLOYMENT IN AUTOMATED MODEL GENERATION

(71) Applicant: Oracle International Corporation, Redwood Shores, CA (US)

(72) Inventors: Vikas Agrawal, Hyderabad (IN); Krishnan Ramanathan, Bengaluru (IN); Praneeth Shishtla, Hyderabad (IN); Jagdish Chand, Pleasanton, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 962 days.

(21) Appl. No.: 17/586,639

(22) Filed: Jan. 27, 2022

(65) Prior Publication Data

US 2022/0237103 A1     Jul. 28, 2022

Related U.S. Application Data

(60) Provisional application No. 63/142,826, filed on Jan. 28, 2021.

(51) Int. Cl.
*G06F 9/50* (2006.01)
*G06N 20/00* (2019.01)

(52) U.S. Cl.
CPC ........... *G06F 9/5077* (2013.01); *G06N 20/00* (2019.01)

(58) Field of Classification Search
None
See application file for complete search history.

(56) References Cited

U.S. PATENT DOCUMENTS 7,590,513 B2 * 9/2009 Jiang ..................... G06F 11/008
                                                                703/2
7,873,535 B2 * 1/2011 Umblijs ............. G06Q 10/0631
                                                              705/7.29

(Continued)

FOREIGN PATENT DOCUMENTS

JP        2018195308        12/2018
JP        2020042669        3/2020
WO        2020156864        8/2020

OTHER PUBLICATIONS

European Patent Office, International Searching Authority, International Search Report and Written Opinion dated Mar. 31, 2022 for International Application No. PCT/US2022/014418 , 15 pages.

(Continued)

*Primary Examiner* — Ryan Barrett
(74) *Attorney, Agent, or Firm* — TUCKER ELLIS LLP

(57) ABSTRACT

In accordance with an embodiment, described herein are systems and methods for use with a computing environment, for providing a determination of model fitness and stability, for model deployment and automated model generation. A model fitness and stability component can provide one or more features that support model selection, use of a model deployability score and deployability flag, and mitigation of model drift risk, to determine model fitness and stability for a particular application. For example, embodiments may be used with analytic applications, data analytics, or other types of computing environments, to provide, for example, a directly actionable risk prediction, in finance applications or other types of applications.

20 Claims, 12 Drawing Sheets

(56) References Cited

U.S. PATENT DOCUMENTS

| | | | |
|---|---|---|---|
| 9,542,646 B1* | 1/2017 | Baughman | G06N 20/00 |
| 9,613,309 B1 | 4/2017 | Apreleva | |
| 2004/0138933 A1 | 7/2004 | LaComb | |
| 2007/0214076 A1 | 9/2007 | Robida | |
| 2011/0246406 A1* | 10/2011 | Lahav | G06F 30/20 |
| | | | 706/46 |
| 2016/0371601 A1* | 12/2016 | Grove | G06N 20/00 |
| 2017/0314961 A1* | 11/2017 | Chen | G06F 18/2135 |
| 2017/0372232 A1* | 12/2017 | Maughan | G06F 3/0482 |
| 2018/0060759 A1* | 3/2018 | Chu | G06N 20/00 |
| 2018/0357569 A1* | 12/2018 | Vadlamani | G06F 40/40 |
| 2019/0108457 A1* | 4/2019 | Jafarpour | G06N 3/09 |
| 2019/0147371 A1* | 5/2019 | Deo | G06N 3/09 |
| | | | 706/12 |
| 2019/0171428 A1* | 6/2019 | Patton | G06F 8/60 |
| 2019/0287178 A1 | 9/2019 | Gaini | |
| 2020/0082296 A1* | 3/2020 | Fly | G06F 17/18 |
| 2020/0201727 A1* | 6/2020 | Nie | G06N 20/00 |
| 2020/0364618 A1* | 11/2020 | Peh | G06Q 10/0635 |
| 2021/0011920 A1* | 1/2021 | Sudarsan | G06N 3/044 |
| 2021/0090101 A1* | 3/2021 | Marti | G06Q 10/067 |
| 2021/0133632 A1* | 5/2021 | Elprin | G06F 11/3409 |
| 2021/0224684 A1* | 7/2021 | Sarkar | G06F 16/907 |
| 2021/0241179 A1* | 8/2021 | Karanth | G06N 20/20 |
| 2021/0279643 A1* | 9/2021 | Koduru | G06F 18/2148 |
| 2021/0334695 A1* | 10/2021 | Raj | G06F 11/3409 |
| 2021/0390455 A1* | 12/2021 | Schierz | G06N 20/00 |
| 2022/0027797 A1* | 1/2022 | Tian | G06N 5/04 |
| 2022/0083916 A1* | 3/2022 | Khan | G06N 20/00 |
| 2022/0138621 A1* | 5/2022 | Patil | G06N 3/084 |
| | | | 706/11 |
| 2022/0156574 A1* | 5/2022 | Anwar | G06N 3/08 |
| 2022/0165292 A1* | 5/2022 | Saki | G06N 5/04 |
| 2022/0172099 A1* | 6/2022 | Das | G06N 20/00 |
| 2022/0198319 A1* | 6/2022 | Singh | G06N 20/00 |
| 2023/0013470 A1* | 1/2023 | Tabet | G06F 18/217 |
| 2024/0005199 A1* | 1/2024 | Butvinik | G06Q 20/4016 |
| 2024/0037457 A1* | 2/2024 | Bhattacharjee | G06N 20/00 |
| 2024/0086767 A1* | 3/2024 | Xu | G06N 7/01 |
| 2024/0370776 A1* | 11/2024 | Srinath | G06N 20/00 |
| 2025/0117694 A1* | 4/2025 | Pinho | G06N 20/00 |

OTHER PUBLICATIONS

European Patent Office, Communication pursuant to Rules 161(1) and 162 EPC dated Sep. 5, 2023 for European Patent Application No. 22704689.3 , 3 pages.

Japan Patent Office, Notice of Reasons for Refusal dated Sep. 17, 2025 for Japanese Patent Application No. 2023-545824 , 8 pages.

Kullback, S.; Leibler, R.A. (1951). "On information and sufficiency"; Annals of Mathematical Statistics. 22 (1): 79-86; doi:10.1214/aoms/1177729694. JSTOR 2236703; 8 pages.

Bhattacharyya, A. (1948). "On a measure of divergence between two statistical populations defined by their probability distributions". Bulletin of the Calcutta Mathematical Society. 35: 99-109. MR 0010358; 11 pages.

Mahalanobis, Prasanta Chandra (1936). "On the generalised distance in statistics" Proceedings of the National Institute of Sciences of India. 2 (1): 49-55; 49 pages.

Ho, Tin Kam (1995). "Random Decision Forests" Proceedings of the 3rd International Conference on Document Analysis and Recognition, Montreal, QC, Aug. 14-16, 1995. pp. 278-282; 5 pages.

Chen, Tianqi; Guestrin, Carlos (2016). "XGBoost: A Scalable Tree Boosting System". In Krishnapuram, Balaji; Shah, Mohak; Smola, Alexander J.; Aggarwal, Charu C.; Shen, Dou; Rastogi, Rajeev (eds.). Proceedings of the 22nd ACM SIGKDD International Conference on Knowledge Discovery and Data Mining, San Francisco, CA, USA, Aug. 13-17, 2016. ACM. pp. 785-794; 10 pages.

Cortes, Corinna; Vapnik, Vladimir N. (1995). "Support-Vector Networks" Machine Learning. 20 (3): 273-297. CiteSeerX 10.1.1.15.9362. doi:10.1007/BF00994018. S2CID 206787478; 25 pages.

Chicco, Davide; Jurman, Giuseppe (Jan. 2020). "The advantages of the Matthews correlation coefficient (MCC) over F1 score and accuracy in binary classification evaluation". BMC Genomics. 21 (1): 6-1-6-13. doi: 10.1186/s12864-019-6413-7; 13 pages.

Matthews, B. W. (1975). "Comparison of the predicted and observed secondary structure of T4 phage lysozyme". Biochimica et Biophysica Acta (BBA)—Protein Structure. 405 (2): 442-451; 4 pages.

Powers, David M W (2011). "Evaluation: From Precision, Recall and F-Measure to ROC, Informedness, Markedness & Correlation". Journal of Machine Learning Technologies. 2 (1): 37-63; 27 pages.

* cited by examiner

Determine a successive differencing of correct classifications and apply a weight to each successively lower for lower probability bins — 810

Apply a penalty for each missed classification. — 820

Apply a weight to the penalty assessed at step 820. — 830

Normalize the generated score by the number of classified samples — 840

Optionally consider other possibilities — 850

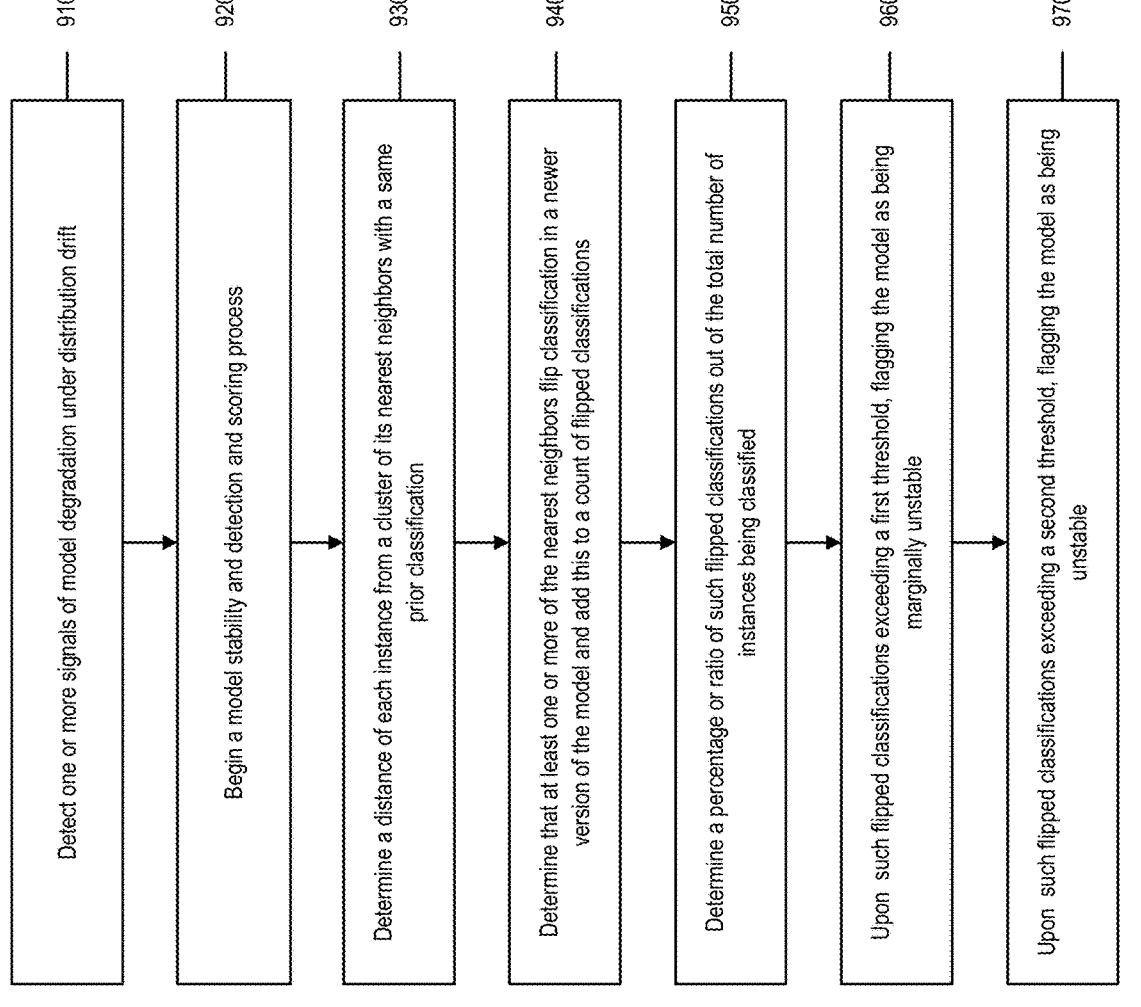

910 Detect one or more signals of model degradation under distribution drift

920 Begin a model stability and detection and scoring process

930 Determine a distance of each instance from a cluster of its nearest neighbors with a same prior classification 940 Determine that at least one or more of the nearest neighbors flip classification in a newer version of the model and add this to a count of flipped classifications 950 Determine a percentage or ratio of such flipped classifications out of the total number of instances being classified 960 Upon such flipped classifications exceeding a first threshold, flagging the model as being marginally unstable 970 Upon such flipped classifications exceeding a second threshold, flagging the model as being unstable

| Summary Information for Customer | | | Top Ten Paid Invoices | | Top Ten Unpaid Invoices |
|---|---|---|---|---|---|
| Total Value of Invoices Outstanding | $ 63,159,780 | | | | |
| Total # of Invoices | 11,826 | 1 | $ | 536,179 | $ 787,012 |
| # of Invoices Paid | 8,374 | 2 | $ | 332,304 | $ 485,976 |
| # of Invoices Not Paid | 3,452 | 3 | $ | 297,174 | $ 420,984 |
| % of Invoices Paid Out of # of All Invoices | 71% | 4 | $ | 180,309 | $ 92,557 |
| % of Invoices Unpaid Out of # All Invoices | 29% | 5 | $ | 44,758 | $ 72,929 |
| Total Amount Predicted Paid (Amount Received, Not at Risk) | $ 32,733,578 | 6 | $ | 39,021 | $ 69,709 |
| Total Amount Not Paid (=Amount of Money at Risk) | $ 30,426,202 | 7 | $ | 33,435 | $ 63,012 |
| Customer Risk % = This fraction of money is not coming back | 48% | 8 | $ | 21,564 | $ 59,947 |
| Average Value of Invoice | 5,341 | 9 | $ | 10,000 | $ 52,848 |
| Average Value of Invoice * Customer Risk % | 2,573 | 10 | $ | 9,999 | $ 49,530 |
| Customer Risk Per Invoice = Average Value of Invoice * Customer Risk % = Amount of money we lose per invoice | 2,573 | Total of Top Ten | $ | 1,504,743 | $ 2,154,504 |
| Outstanding Amount of Top 20% Invoices Not Paid | $ 8,957,716 | | | | |
| Top 20% Invoices Not Paid as % of Total Invoices Not Paid | 29% | | | | |
| Outstanding Amount of Top 20% Invoices Paid | $ 17,644,177 | | | | |
| Top 20% Invoices Paid as % of Total Invoices Paid | 54% | | | | |

| Most Likely Predicted As | Bin Indicator | Bin Value | Population Indicator | Population Value | Diff from Population | As % Difference from Population Value | If Then Else Placeholder Based Explanation |
|---|---|---|---|---|---|---|---|
| Not Default | paid_average_days_delay | 715.9949485 | paid_average_days_delay_population_avg | 448.4037763 | 267.58 | 60% | For cases predicted as likely to be paid, the average delay for cases paid was much higher than the population |
| Not Default | paid_late_count | 3.939393939 | paid_late_count_population_avg | 2.457516634 | 1.48 | 60% | For cases predicted as likely to be paid, the number of invoices paid late was much higher than the population |
| Not Default | paid_late_invoice_ratio | 0.984848485 | paid_late_invoice_ratio_population_avg | 0.60929557 | 0.38 | 62% | For cases predicted as likely to be paid, the ratio of invoices paid late was much higher than the population |
| Not Default | paid_late_stddev | 1.509927164 | paid_late_stddev_population_avg | 0.799724529 | 0.71 | 89% | For cases predicted as likely to be paid, the spread in number of invoices paid late was much higher than the population |
| Not Default | paid_average_days_delay | 84.45238095 | paid_average_days_delay_population_avg | 448.4037763 | -363.95 | -81% | For cases predicted as likely to be paid, the average delay for cases paid was much lower than the population |
| Not Default | paid_late_count | 0.214285714 | paid_late_count_population_avg | 2.457516634 | -2.24 | -91% | For cases predicted as likely to be paid, the number of invoices paid late was much lower than the population |
| Not Default | paid_late_invoice_ratio | 0.095238095 | paid_late_invoice_ratio_population_avg | 0.60929557 | -0.51 | -84% | For cases predicted as likely to be paid, the ratio of invoices paid late was much lower than the population |
| Not Default | paid_late_stddev | 0.10679262 | paid_late_stddev_population_avg | 0.799724529 | -0.69 | -87% | For cases predicted as likely to be paid, the spread in number of invoices paid late was much lower than the population |
| Not Default | paid_late_count | 1 | paid_late_count_population_avg | 2.457516634 | -1.46 | -59% | For cases predicted as likely to be paid, the number of invoices paid late was much lower than the population |
| Not Default | paid_late_stddev | -0.01734635 | paid_late_stddev_population_avg | 0.799724529 | -0.82 | -102% | For cases predicted as likely to be paid, the spread in number of invoices paid late was much lower than the population |
| Default | paid_average_days_delay | 81.11111111 | paid_average_days_delay_population_avg | 448.4037763 | -367.29 | -82% | For cases predicted as likely to be not paid, the average delay for cases paid late was much lower than the population |
| Default | paid_late_count | 1 | paid_late_count_population_avg | 2.457516634 | -1.46 | -59% | For cases predicted as likely to be not paid, the number of invoices paid late was much lower than the population |
| Default | paid_late_invoice_ratio | 0.055555556 | paid_late_invoice_ratio_population_avg | 0.60929557 | -0.55 | -91% | For cases predicted as likely to be not paid, the ratio of invoices paid late was much lower than the population |
| Default | paid_average_days_delay | 81.11111111 | paid_average_days_delay_population_avg | 448.4037763 | -367.29 | -82% | For cases predicted as likely to be not paid, the average delay for cases paid late was much lower than the population |
| Default | paid_late_count | 1 | paid_late_count_population_avg | 2.457516634 | -1.46 | -59% | For cases predicted as likely to be not paid, the number of invoices paid late was much lower than the population |
| Default | paid_late_invoice_ratio | 0.055555556 | paid_late_invoice_ratio_population_avg | 0.60929557 | -0.55 | -91% | For cases predicted as likely to be not paid, the ratio of invoices paid late was much lower than the population |
| Default | paid_late_stddev | 0.236839832 | paid_late_stddev_population_avg | 0.799724529 | -0.56 | -70% | For cases predicted as likely to be not paid, the spread in number of invoices paid late was much lower than the population |
| Default | paid_late_stddev | 0.27475498 | paid_late_stddev_population_avg | 0.799724529 | -0.52 | -66% | For cases predicted as likely to be not paid, the spread in number of invoices paid late was much lower than the population |

*FIGURE 11*

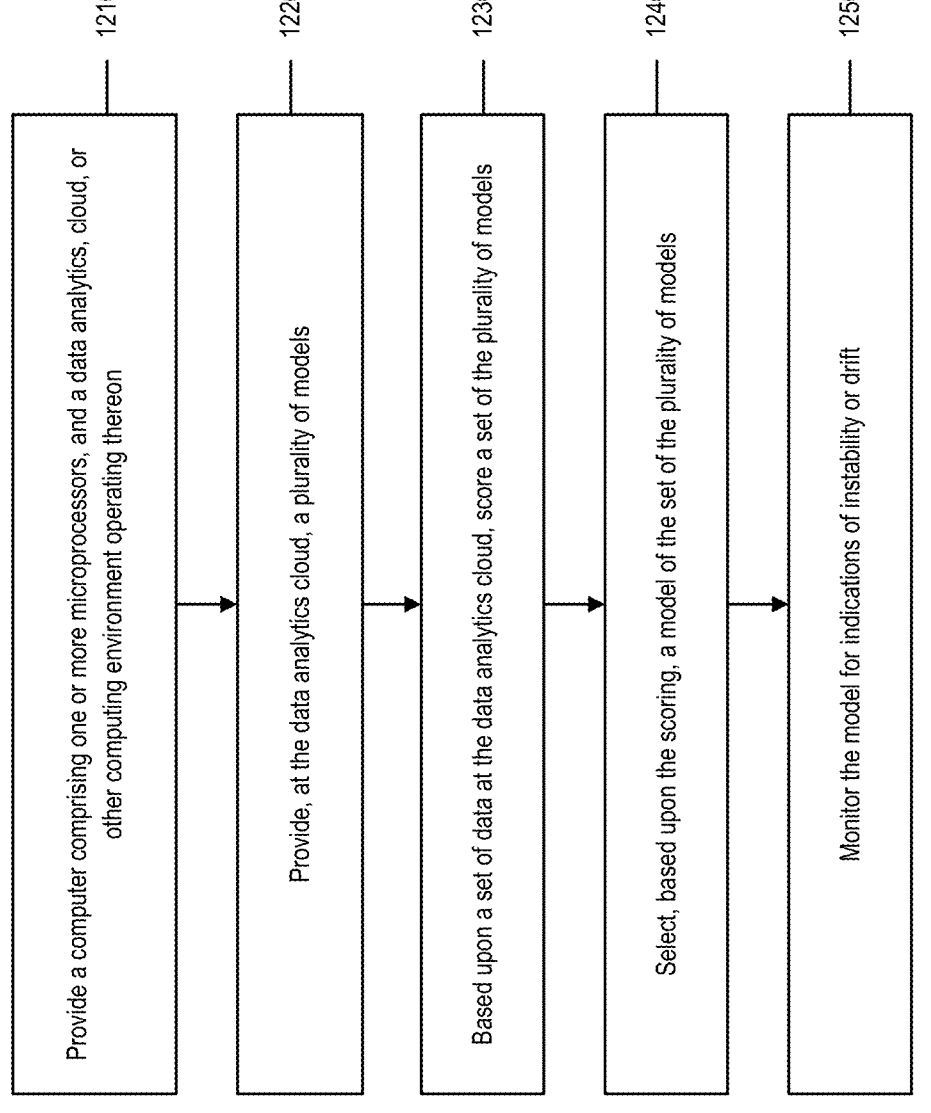

1210

Provide a computer comprising one or more microprocessors, and a data analytics, cloud, or other computing environment operating thereon

1220

Provide, at the data analytics cloud, a plurality of models

1230

Based upon a set of data at the data analytics cloud, score a set of the plurality of models

1240

Select, based upon the scoring, a model of the set of the plurality of models

1250

Monitor the model for indications of instability or drift

*FIGURE 12*

SYSTEM AND METHOD FOR DETERMINATION OF MODEL FITNESS AND STABILITY FOR MODEL DEPLOYMENT IN AUTOMATED MODEL GENERATION

COPYRIGHT NOTICE

CLAIM OF PRIORITY

This application claims the benefit of priority to U.S. Provisional Patent application titled "SYSTEM AND METHOD FOR DETERMINATION OF MODEL FITNESS AND STABILITY FOR MODEL DEPLOYMENT IN AUTOMATED MODEL GENERATION", Application No. 63/142,826, filed Jan. 28, 2021, which application is herein incorporated by reference.

TECHNICAL FIELD

Embodiments described herein are generally related to data models, and data analytics environments, and to systems and methods for providing a determination of model fitness and stability, for model deployment and automated model generation.

BACKGROUND

With regard to systems for supporting data analytics, and the process of addressing requirements for particular customers, for example predicting account receivables in a customer's finance application, it may be observed that different customers may need generation of different models that approximate the characteristics of their underlying data-generating business processes.

Such models may be different for similar processes in different departments of a customer enterprise. Additionally, it may be seen that, over time, the data-generating business processes may change, and the characteristic distributions of inputs to those processes may changes also.

SUMMARY

In accordance with an embodiment, described herein are systems and methods for use with a computing environment, for providing a determination of model fitness and stability, for model deployment and automated model generation. A model fitness and stability component can provide one or more features that support model selection, use of a model deployability score and deployability flag, and mitigation of model drift risk, to determine model fitness and stability for a particular application. For example, embodiments may be used with analytic applications, data analytics, or other types of computing environments, to provide, for example, a directly actionable risk prediction, in finance applications or other types of applications.

BRIEF DESCRIPTION OF THE DRAWINGS

FIG. 9 further illustrates a process or method for determination of model fitness and stability, in accordance with an embodiment.

FIG. 10 is an illustration of a sorted list of invoices, in accordance with an embodiment.

FIG. 11 is an illustration of outputs of a model to analyze data, in accordance with an embodiment.

FIG. 12 is a flowchart of a method for determination of model fitness and stability for model deployment in automated model generation, in accordance with an embodiment.

DETAILED DESCRIPTION

Figure 1:
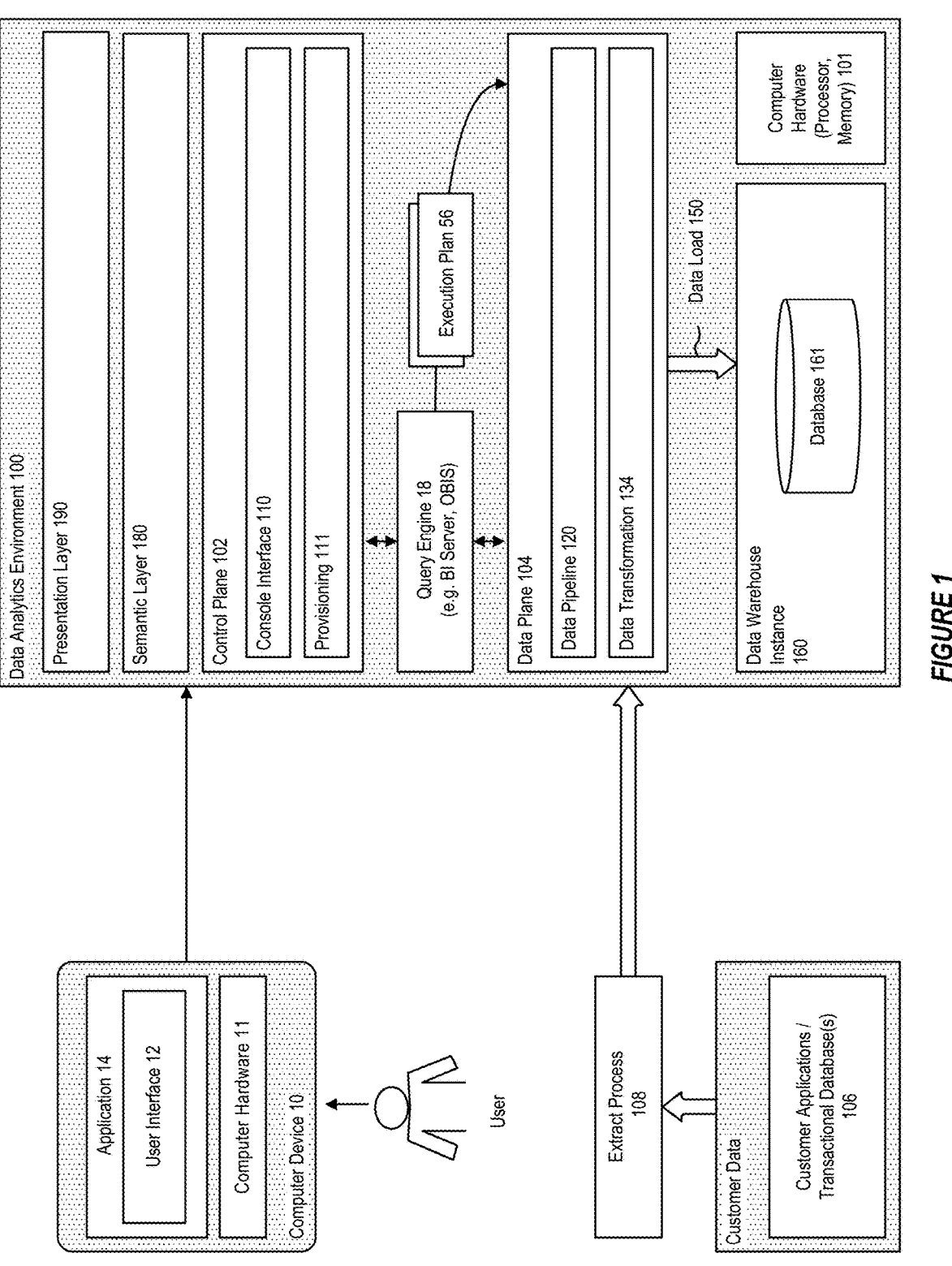
FIG. 1 illustrates an example data analytics environment, in accordance with an embodiment.

As described above, with regard to systems for supporting data analytics, and the process of addressing requirements for particular customers, for example predicting account receivables in a customer's finance application, it may be observed that different customers may need generation of different models that approximate the characteristics of their underlying data-generating business processes.

Such models may be different for similar processes in different departments of a customer enterprise. Additionally, it may be seen that, over time, the data-generating business processes may change, and the characteristic distributions of inputs to those processes may changes also.

In accordance with an embodiment, described herein are systems and methods for use with a computing environment, for providing a determination of model fitness and stability, for model deployment and automated model generation. A model fitness and stability component can provide one or more features that support model selection, use of a model deployability score and deployability flag, and mitigation of model drift risk, to determine model fitness and stability for a particular application. In accordance with various embodiments, the described approach can be used to address various considerations, such as, for example:

Model fitness benefits from automation, since manual methods are prohibitively expensive in time and money. When the systems and methods create classes of models for enterprises using data samples, the systems do not get the opportunity to manually tune models with expert data scientists using customer data for each case, as there are thousands of customers, and it is prohibitively expensive to manually examine the vagaries of each dataset and tune the models based on the data. The described approach can systematically find model fits that represent the maximal distinguishing information content that can be extracted from customer datasets when using a broad set of specific model classes.

Additionally, the use of a score necessitates automatic generation of new models to account for changes over time, across departments, automatically filtering through thousands of potential model candidates using suitable metrics without requiring human intervention, and then finding the most significant actionable insights based on the predictions. The described approach addresses this specific problem for the space of binary classification models, and can be extended to multi-class classification.

Model drift risk should be mitigated. While model accuracy metrics can vary wildly depending the training and test distribution drifts, the systems and methods cannot use merely model accuracy metrics as criteria for model selection. As input distributions or the distribution of the sample of the population taken on specific days or weeks changes, it is expected to see significant drifts in the decision boundaries in newer models, even to the extent of reversing classifications on multiple instances such classifying an invoice as likely to be not paid today, when yesterday it was classified likely to be paid. The described approach can be used to examine how far the scoring distributions have shifted from the training distributions, and how far is the shift between training distributions over time.

Models should be stable. If it is detected that the models are unstable enough to have decision boundaries drift substantially every day, this indicates multiple problems in the model fit. In such cases, the decisions on classifications will keep changing on a daily basis to the point of flipping previous day's predictions without change in the data for individual instances. The described approach can be used to detect such instability.

Data Analytics Environments

Generally described, data analytics enables the computer-based examination or analysis of large amounts of data, in order to derive conclusions or other information from that data; while business intelligence tools (BI) provide an organization's business users with information describing their enterprise data in a format that enables those business users to make strategic business decisions.

Examples of data analytics environments and business intelligence tools/servers include Oracle Business Intelligence Server (OBIS), Oracle Analytics Cloud (OAC), and Fusion Analytics Warehouse (FAW), which support features such as data mining or analytics, and analytic applications.

FIG. 1 illustrates an example data analytics environment, in accordance with an embodiment.

The example embodiment illustrated in FIG. 1 is provided for purposes of illustrating an example of a data analytics environment in association with which various embodiments described herein can be used. In accordance with other embodiments and examples, the approach described herein can be used with other types of data analytics, database, or data warehouse environments. The components and processes illustrated in FIG. 1, and as further described herein with regard to various other embodiments, can be provided as software or program code executable by, for example, a cloud computing system, or other suitably-programmed computer system.

As illustrated in FIG. 1, in accordance with an embodiment, a data analytics environment 100 can be provided by, or otherwise operate at, a computer system having a computer hardware (e.g., processor, memory) 101, and including one or more software components operating as a control plane 102, and a data plane 104, and providing access to a data warehouse, data warehouse instance 160 (database 161, or other type of data source).

In accordance with an embodiment, the control plane operates to provide control for cloud or other software products offered within the context of a SaaS or cloud environment, such as, for example, an Oracle Analytics Cloud environment, or other type of cloud environment. For example, in accordance with an embodiment, the control plane can include a console interface 110 that enables access by a customer (tenant) and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the data analytics environment. The model format can be provided in any data format suited for storage in a data warehouse. In accordance with an embodiment, the data plane can also include a data and configuration user interface, and mapping and configuration database.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the data analytics schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

In accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, the data transformation layer can transform extracted data into a format suitable for loading into a customer schema of data warehouse, for example according to the data model. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Different customers of a data analytics environment may have different requirements with regard to how their data is classified, aggregated, or transformed, for purposes of providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, a semantic model can be defined, for example, in an Oracle environment, as a BI Repository (RPD) file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, a customer may perform modifications to their data source model, to support their particular requirements, for example by adding custom facts or dimensions associated with the data stored in their data warehouse instance; and the system can extend the semantic model accordingly.

In accordance with an embodiment, the presentation layer can enable access to the data content using, for example, a software analytic application, user interface, dashboard, key performance indicators (KPI's); or other type of report or interface as may be provided by products such as, for example, Oracle Analytics Cloud, or Oracle Analytics for Applications.

In accordance with an embodiment, a query engine 18 (e.g., OBIS) operates in the manner of a federated query engine to serve analytical queries within, e.g., an Oracle Analytics Cloud environment, via SQL, pushes down operations to supported databases, and translates business user queries into appropriate database-specific query languages (e.g., Oracle SQL, SQL Server SQL, DB2 SQL, or Essbase MDX). The query engine (e.g., OBIS) also supports internal execution of SQL operators that cannot be pushed down to the databases.

In accordance with an embodiment, a user/developer can interact with a client computer device 10 that includes a computer hardware 11 (e.g., processor, storage, memory), user interface 12, and application 14. A query engine or business intelligence server such as OBIS generally operates to process inbound, e.g., SQL, requests against a database model, build and execute one or more physical database queries, process the data appropriately, and then return the data in response to the request.

To accomplish this, in accordance with an embodiment, the query engine or business intelligence server can include various components or features, such as a logical or business model or metadata that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, a query engine or business intelligence server may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, the query engine (e.g., OBIS) can process queries against a database according to a query execution plan 56, that can include various child (leaf) nodes, generally referred to herein in various embodiments as RqLists, and produces one or more diagnostic log entries. Within a query execution plan, each execution plan component (RqList) represents a block of query in the query execution plan, and generally translates to a SELECT statement. An RqList may have nested child RqLists, similar to how a SELECT statement can select from nested SELECT statements.

In accordance with an embodiment, during operation the query engine or business intelligence server can create a query execution plan which can then be further optimized, for example to perform aggregations of data necessary to respond to a request. Data can be combined together and further calculations applied, before the results are returned to the calling application, for example via the ODBC interface.

In accordance with an embodiment, a complex, multi-pass request that requires multiple data sources may require the query engine or business intelligence server to break the query down, determine which sources, multi-pass calculations, and aggregates can be used, and generate the logical query execution plan spanning multiple databases and physical SQL statements, wherein the results can then be passed back, and further joined or aggregated by the query engine or business intelligence server.

Figure 2:
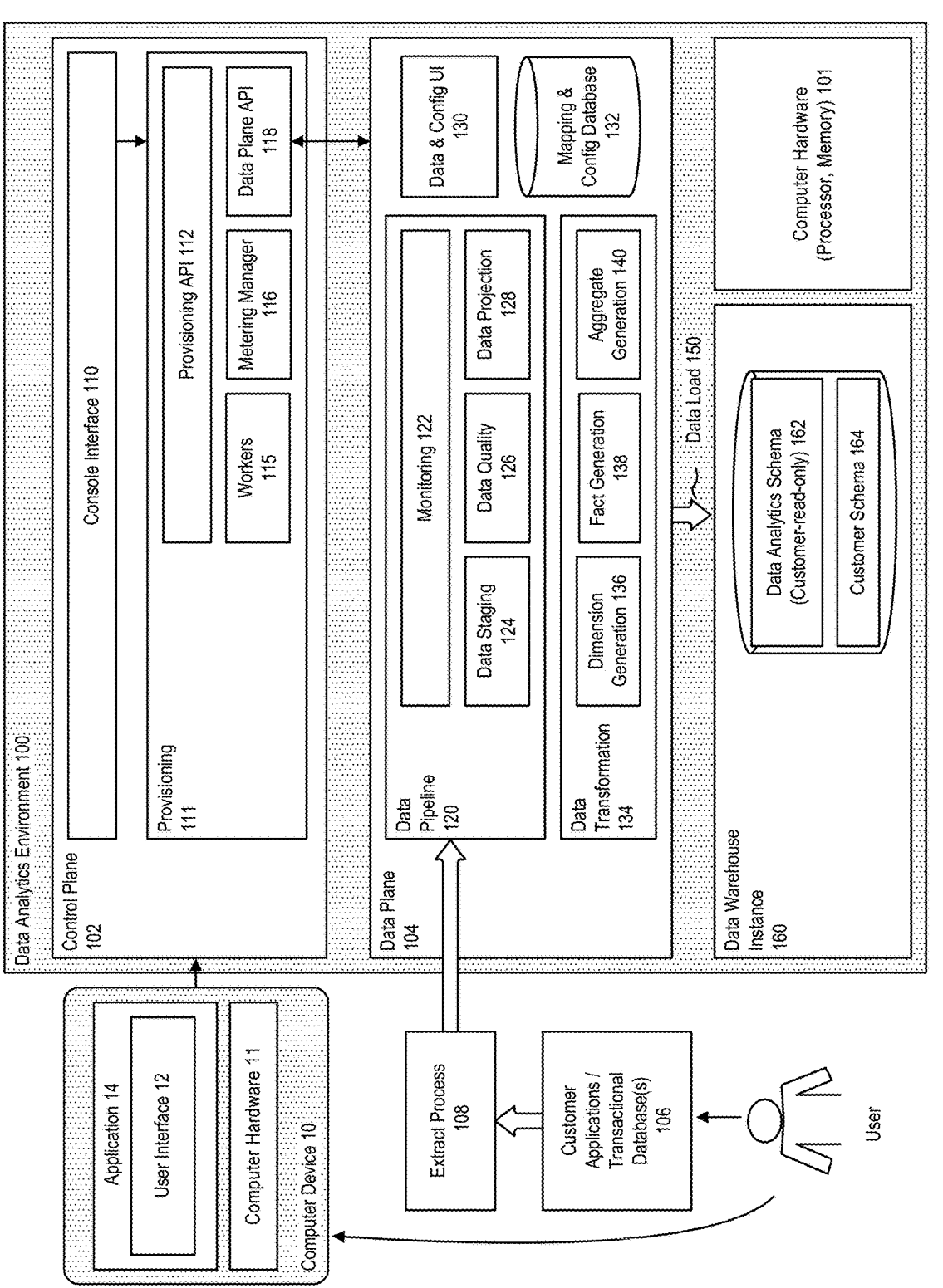
FIG. 2 further illustrates an example data analytics environment, in accordance with an embodiment.

FIG. 2 further illustrates an example data analytics environment, in accordance with an embodiment.

As illustrated in FIG. 2, in accordance with an embodiment, the provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane. For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default data analytics schema (referred to herein in accordance with some embodiments as an analytic warehouse schema) 162 and, for each customer (tenant) of the system, a customer schema 164.

In accordance with an embodiment, to support multiple tenants, the system can enable the use of multiple data warehouses or data warehouse instances. For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

For example, in accordance with an embodiment, dimensions can include categories of data such as, for example, "name," "address," or "age". Fact generation includes the generation of values that data can take, or "measures." Facts can be associated with appropriate dimensions in the data warehouse instance. Aggregate generation includes creation of data mappings which compute aggregations of the transformed data to existing data in the customer schema of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure, to load the transformed data into the customer schema of the data warehouse instance. Subsequent to the loading of the transformed data into customer schema, the transformed data can be analyzed and used in a variety of additional business intelligence processes.

Figure 3:
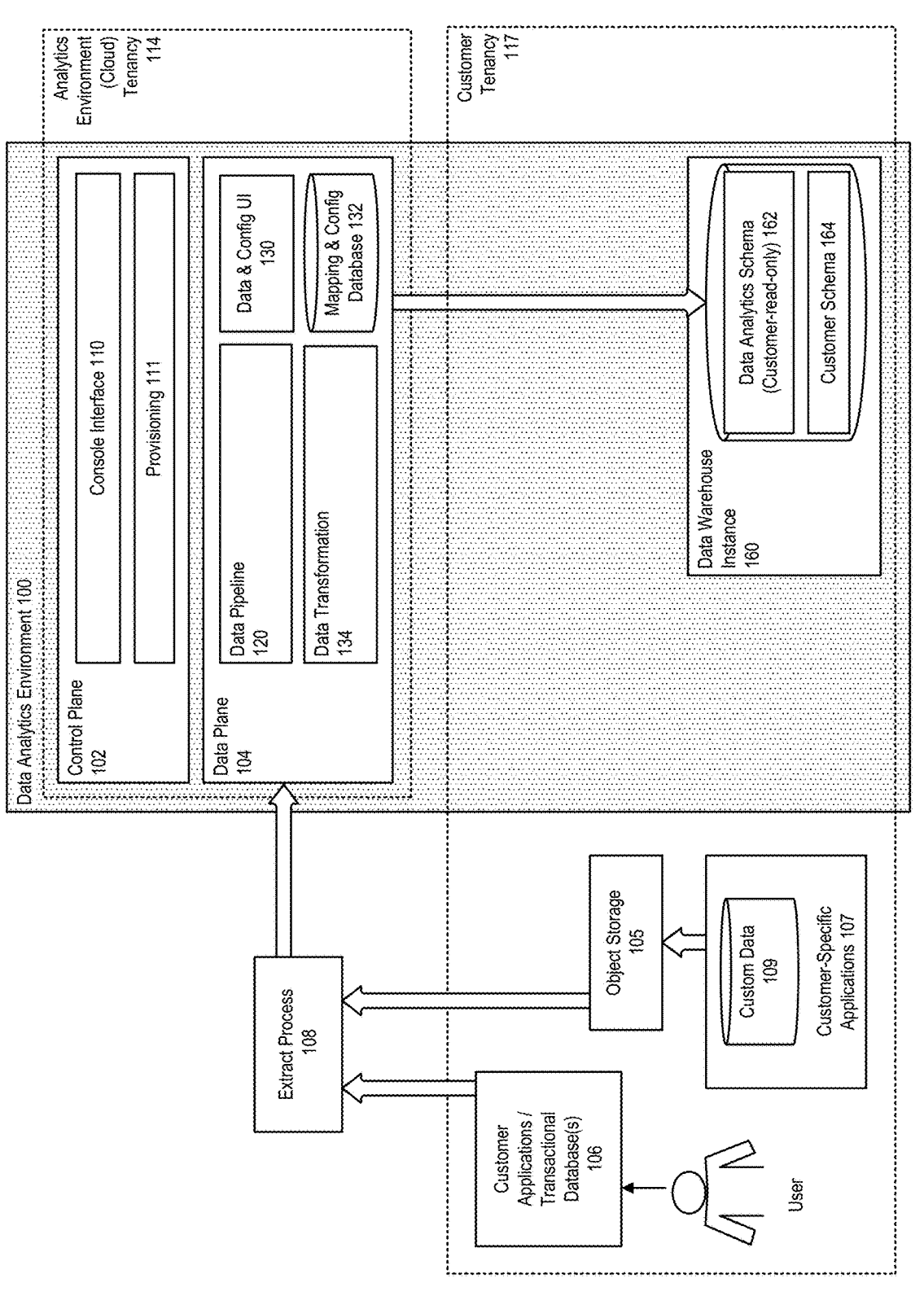
FIG. 3 further illustrates an example data analytics environment, in accordance with an embodiment.

FIG. 3 further illustrates an example data analytics environment, in accordance with an embodiment.

As illustrated in FIG. 3, in accordance with an embodiment, data can be sourced, e.g., from a customer's (tenant's) enterprise software application or data environment (106), using the data pipeline process; or as custom data 109 sourced from one or more customer-specific applications 107; and loaded to a data warehouse instance, including in some examples the use of an object storage 105 for storage of the data.

In accordance with embodiments of analytics environments such as, for example, Oracle Analytics Cloud (OAC), a user can create a data set that uses tables from different connections and schemas. The system uses the relationships defined between these tables to create relationships or joins in the data set.

In accordance with an embodiment, for each customer (tenant), the system uses the data analytics schema that is maintained and updated by the system, within a system/ cloud tenancy 114, to pre-populate a data warehouse instance for the customer, based on an analysis of the data within that customer's enterprise applications environment, and within a customer tenancy 117. As such, the data analytics schema maintained by the system enables data to be retrieved, by the data pipeline or process, from the customer's environment, and loaded to the customer's data warehouse instance.

In accordance with an embodiment, the system also provides, for each customer of the environment, a customer schema that is readily modifiable by the customer, and which allows the customer to supplement and utilize the data within their own data warehouse instance. For each customer, their resultant data warehouse instance operates as a database whose contents are partly-controlled by the customer; and partly-controlled by the environment (system).

For example, in accordance with an embodiment, a data warehouse (e.g., ADW) can include a data analytics schema and, for each customer/tenant, a customer schema sourced from their enterprise software application or data environment. The data provisioned in a data warehouse tenancy (e.g., an ADW cloud tenancy) is accessible only to that tenant; while at the same time allowing access to various, e.g., ETL-related or other features of the shared environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Figure 4:
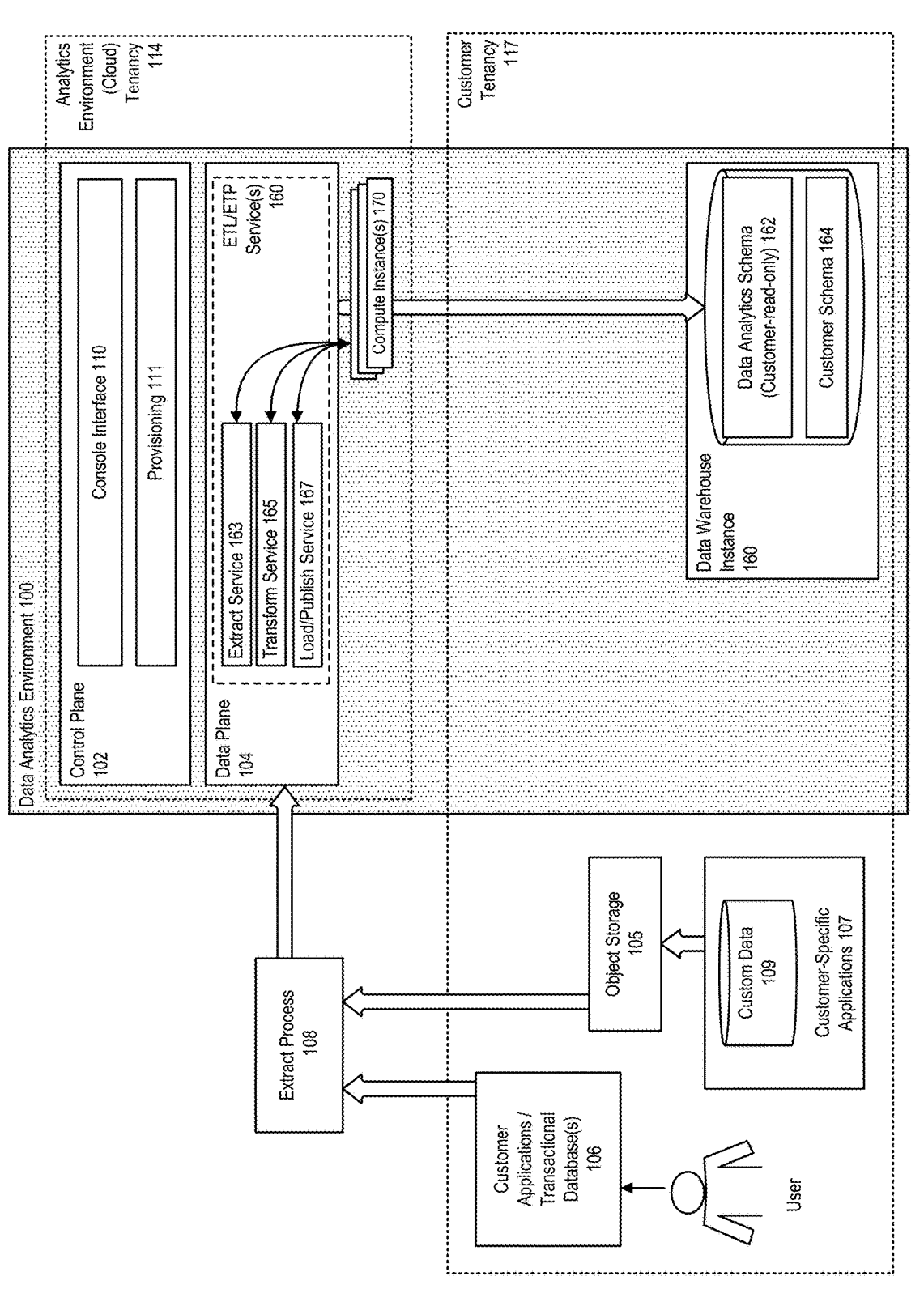
FIG. 4 further illustrates an example data analytics environment, in accordance with an embodiment.

FIG. 4 further illustrates an example data analytics environment, in accordance with an embodiment.

As illustrated in FIG. 4, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

For example, in accordance with an embodiment, a list of view objects for extractions can be submitted, for example, to an Oracle BI Cloud Connector (BICC) component via a ReST call. The extracted files can be uploaded to an object storage component, such as, for example, an Oracle Storage Service (OSS) component, for storage of the data. The transformation process takes the data files from object storage component (e.g., OSS), and applies a business logic while loading them to a target data warehouse, e.g., an ADW database, which is internal to the data pipeline or process, and is not exposed to the customer (tenant). A load/publish service or process takes the data from the, e.g., ADW database or warehouse, and publishes it to a data warehouse instance that is accessible to the customer (tenant).

Figure 5:
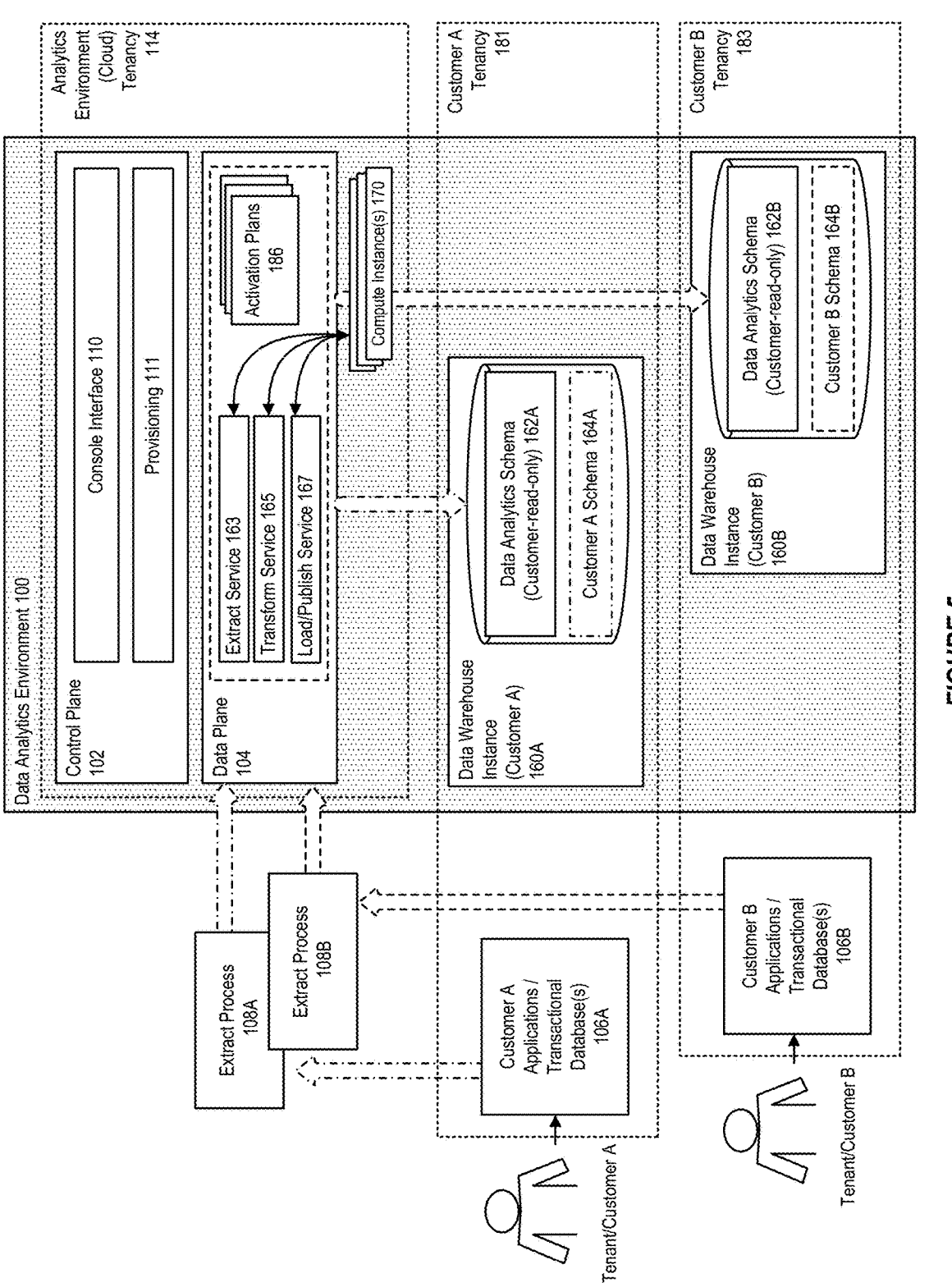
FIG. 5 further illustrates an example data analytics environment, in accordance with an embodiment.

FIG. 5 further illustrates an example data analytics environment, in accordance with an embodiment.

As illustrated in FIG. 5, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, a data analytics schema that is updated on a periodic basis, by the system in accordance with best practices for a particular analytics use case.

In accordance with an embodiment, for each of a plurality of customers (e.g., customers A, B), the system uses the data analytics schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the data analytics environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the data analytics environment, their resultant data warehouse instance operates as a database whose contents are partly-controlled by the customer; and partly-controlled by the data analytics environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

Determination of Model Fitness and Stability

In accordance with an embodiment, the system can include a means of determining model fitness and stability, for model deployment and automated model generation.

Figure 6:
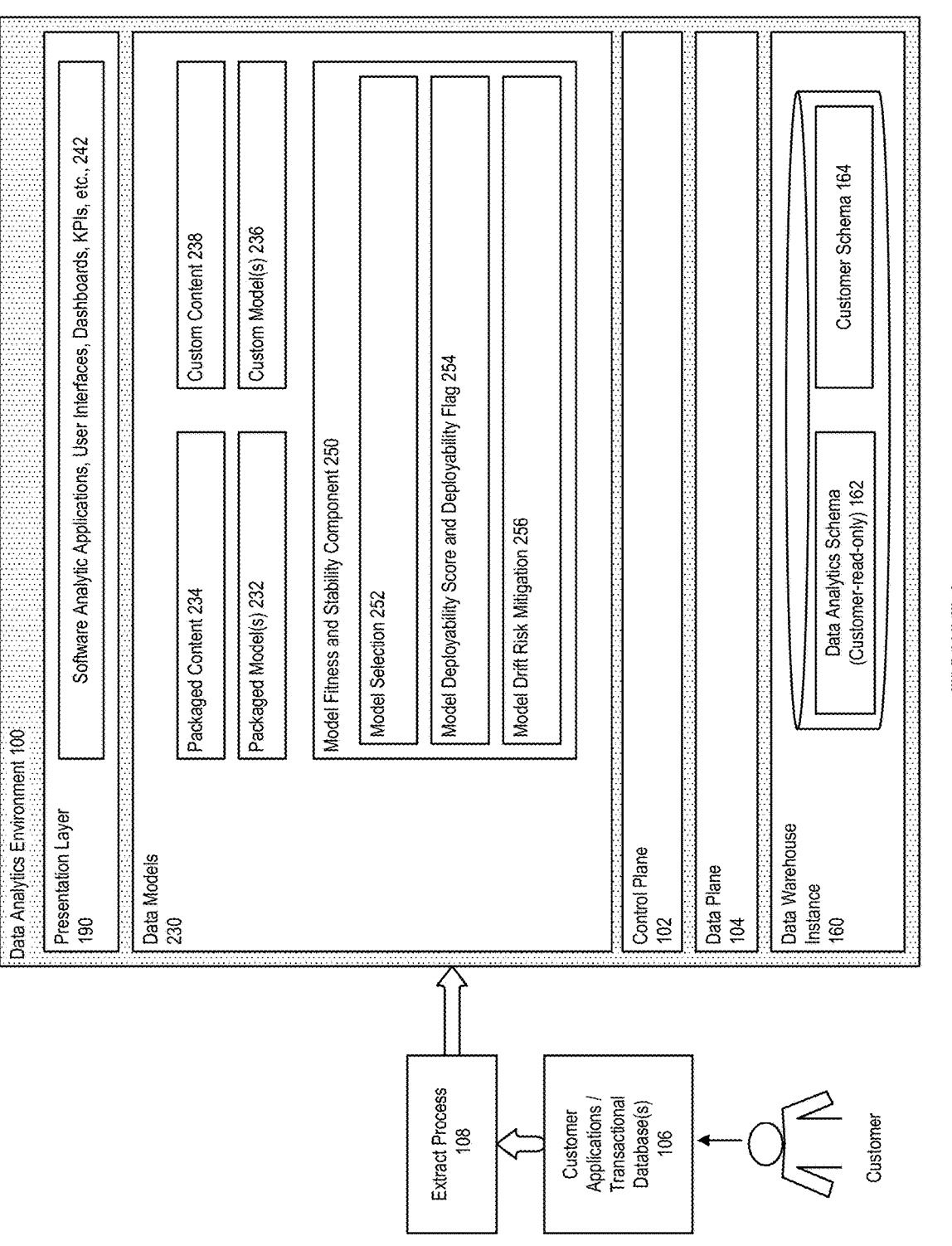
FIG. 6 illustrates the determination of model fitness and stability, for use in association with a data analytics environment, in accordance with an embodiment.

FIG. 6 illustrates the determination of model fitness and stability, for use in association with a data analytics environment, in accordance with an embodiment.

For example, as illustrated in FIG. 6, in accordance with an embodiment, the system can comprise one or more data models 230. A packaged (out-of-the-box, initial) model 232 can be used to provide a packaged content 234, based on use of an ETL or other data pipeline or process as described above, to load data from a customer's enterprise software application or data environment into a data warehouse instance, wherein the packaged model can then be used to provide packaged content to a presentation layer 240. A custom model 236 can be used to extend a packaged model, or provide custom content 238 to the presentation layer.

In accordance with an embodiment, the presentation layer can enable access to data content using, for example, a software analytic application, user interface, dashboard, key performance indicators (KPI's) 242; or other type of report or interface as may be provided by products such as, for example, Oracle Analytics Cloud, or Oracle Analytics for Applications.

As further illustrated in FIG. 6, in accordance with an embodiment, the system comprises a model fitness and stability component 250, which as described below can provide one or more features that support model selection 252, use of a model deployability score and deployability flag 254, and mitigation of model drift risk 256, to determine model fitness and stability for a particular application.

In accordance with an embodiment, for customer business needs requiring automatic generation of new models, to account for changes over time, across departments, the system enables automatically filtering through thousands of potential model candidates using suitable metrics without requiring human intervention, and then finding the most significant actionable insights based on the predictions.

Model Scoring and Selection

As described above, in accordance with an embodiment, the system comprises a model fitness and stability component which can provide one or more features that support model selection, to determine model fitness and stability for a particular application.

In problems of binary classification, such as for example, whether a customer will pay accounts receivable in time or not, the determination of model selection is important. In such environments, various classes of metrics can be used to determine model fitness.

In accordance with an embodiment, a first class of metrics addresses the issue of skewed probability bins produced by different algorithms without calibration, that tend to weigh towards the top (e.g. p=[0.8, 0.9]) and bottom (e.g. p=[0.1, 0.2]) of the distribution, or that are unevenly distributed such that the highest probability bins (e.g. p=[0.9, 1]) might have a lower proportion of cases than successively lower probability bins which may have a higher proportion of cases, or there might be saw-toothed patterns of unevenness.

Success Criterion for a Model

For a well calibrated model that is deployed, the expectation is that the instance membership of probability bins to steadily and sharply decline (e.g., exponentially) from the top bins down to the lowest bins. This would indicate that the model is classifying most cases with high confidence, and only a few cases with low confidence.

In accordance with an embodiment, to filter out and deploy only such models, the system employs a metric to find models that meet the above criterion, and to remove models which show characteristics of a saw tooth frequency of instances in probability bins.

Score based on Probability Bins

Figure 7:
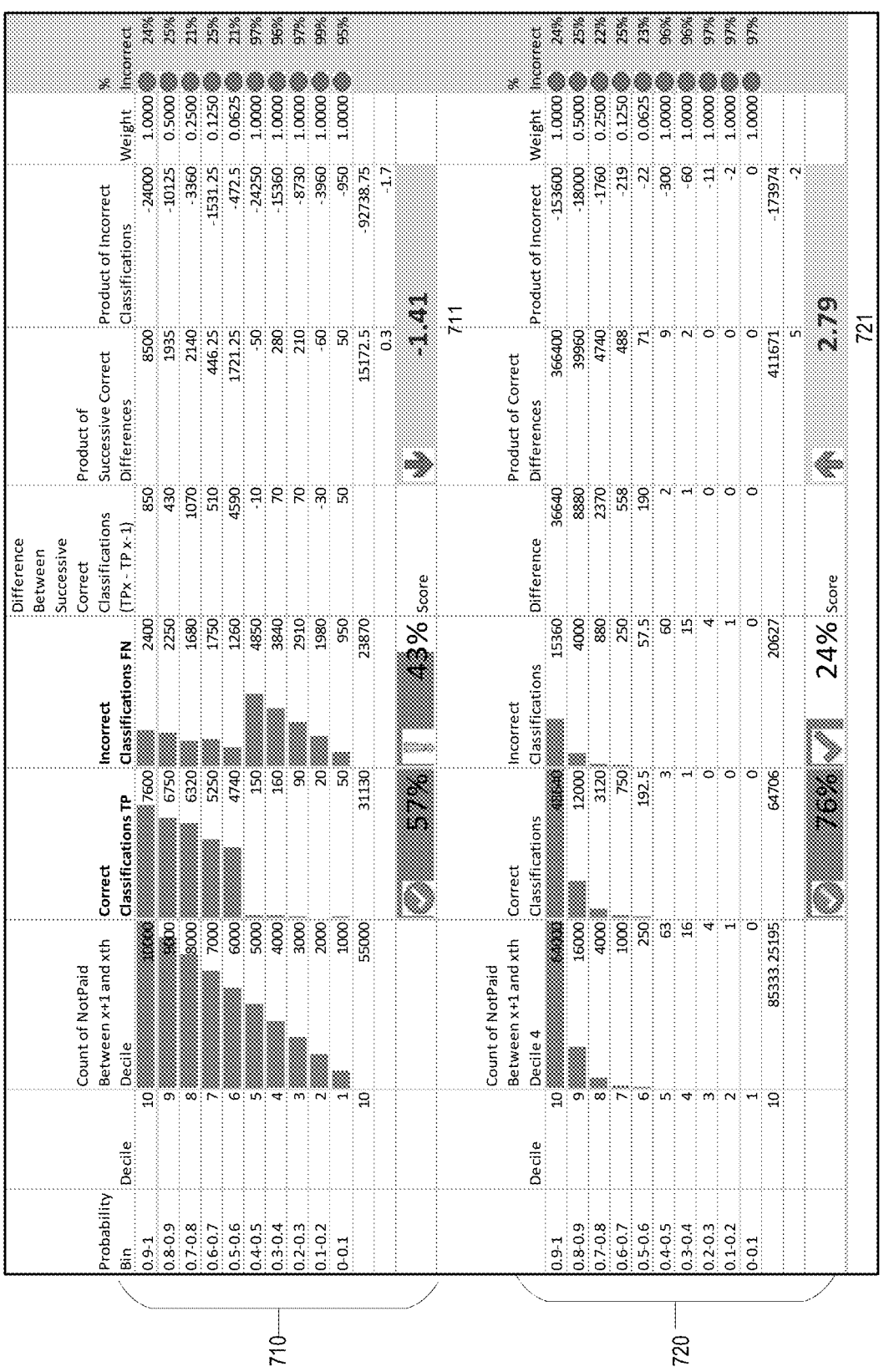
FIG. 7 illustrates example comparisons of probability scores for various models, in accordance with an embodiment.

FIG. 7 illustrates example comparisons of probability scores for various models, in accordance with an embodiment.

As illustrated in FIG. 7, in accordance with an embodiment, a score can be based on probability bins, with sharply decreasing correct classifications from top probability bin to bottom bin.

In accordance with an embodiment, as shown in FIG. 7, a score is generated for two different models, namely model 710 and 720. Each of the models 710 and 720 are examples of models that can be used to determine whether an invoice will be paid or not. As shown, the models are split into 10 probability bins. A number of correct classifications, as well as incorrect classifications are shown in the scoring model, and the weights of each associated scoring mechanisms are provides as well. As shown, model 710 has a near linear decline between each probability bin, while model 720 has an exponential-like decline from a high probability (0.9-1) to a low probability.

In accordance with an embodiment, a resultant score 711 and 721 for each model can be determined, showing that the model having an exponential decline in probability is scored higher, as would be indicative of a good model that predicts correct results with a high probability.

In accordance with an embodiment, the example scoring function shown below represents a class of functions which have a modified staircase shape, to have a descending penalty for non-reduction in number of correctly classified cases from higher probability bins to lower bins, and penalty for all bins for their misclassification, normalized by the total number of instances being classified.

(Equation 1)

$$\text{Probability Bins Score}(\lambda) = \frac{\left(\dfrac{n}{\left(1 + \dfrac{m}{n\log(n)}\right)^n}\right) \sum\limits_{x=\lceil np \rceil + 1}^{n} (C_x - C_{x-1} - NC)x + \left(1 + \dfrac{m}{n\log(n)}\right)^x - \sum\limits_{x=1}^{\lceil np \rceil} (C_x - C_{x-1} - NC_x)x}{\sum\limits_{x=1}^{n} (AC_x)} =$$

-continued $$\sum_{x=\lceil np\rceil+1}^{n} (C_x - C_{x-1} - NC_x)nx\left(1 + \frac{m}{n\log(n)}\right)^{x-n} -$$

$$\frac{\sum_{x=1}^{\lceil np\rceil}(C_x - C_{x-1} - NC_x)x}{\sum_{x=1}^{n}(AC_x)}$$

Wherein a system programmed according to the above (Equation 1) considers:

p=Probability below which classifier always classifies as other class (configurable by customer or their data scientists).

n=Total number of even Bins of Probabilities taken (e.g. n=10 for 10 bins by equi-ranged probability ranges, n=100 for 100 bins by equal probability ranges).

m=An integer between 10 and 90, usually 10 is adequate for model deployment unless a very steep exponential is warranted by the data scientists.

x=Ordered list of quantiles from lowest to highest probability bins (X=[1,2,3,4,5,6,7,8,9,10] for 10 bins).

$C_x$=Number of Correct Classifications Corresponding to a Bin of Probabilities.

$NC_x$=Number of Incorrect Classifications Corresponding to a Bin of Probabilities.

$AC_x$=Number of All Classifications (Correct+Incorrect) Corresponding to a Bin of Probabilities.

$C_x - c_{x-1}$=Successive Differencing of Correct Classification.

$NC_x$=Penalty for Misclassification by Probability Bins.

$$\frac{m}{n\log(n)}$$

is the factor by which we reduce the weights from top bins to bottom bins, successively.

$$\left(1 + \frac{m}{n\log(n)}\right)^{x-n}$$

Automated Reverse Exponentially Weighted Penalty from Top Probability Bins Down.

$$\sum_{x=1}^{n}(AC_x)$$

Normalized by Number of Classified Samples.

In accordance with an embodiment, Monte Carlo simulations can be used to determine that for a model to pass to deployment then $\lambda\leq1$, with Matthews Correlation Coefficient (MCC) exceeding 0.5, and that models with $\lambda\leq0$ cannot be deployed at all. The simulations show that a model with $0.8\leq\lambda\leq1$ can be deployed only if the determined MCC≥0.6, or if F1 Score >0.85 where customer is ambivalent between recall and precision, or $F_\beta$>0.8 where customer provides a preference for recall vs precision.

Figure 8:
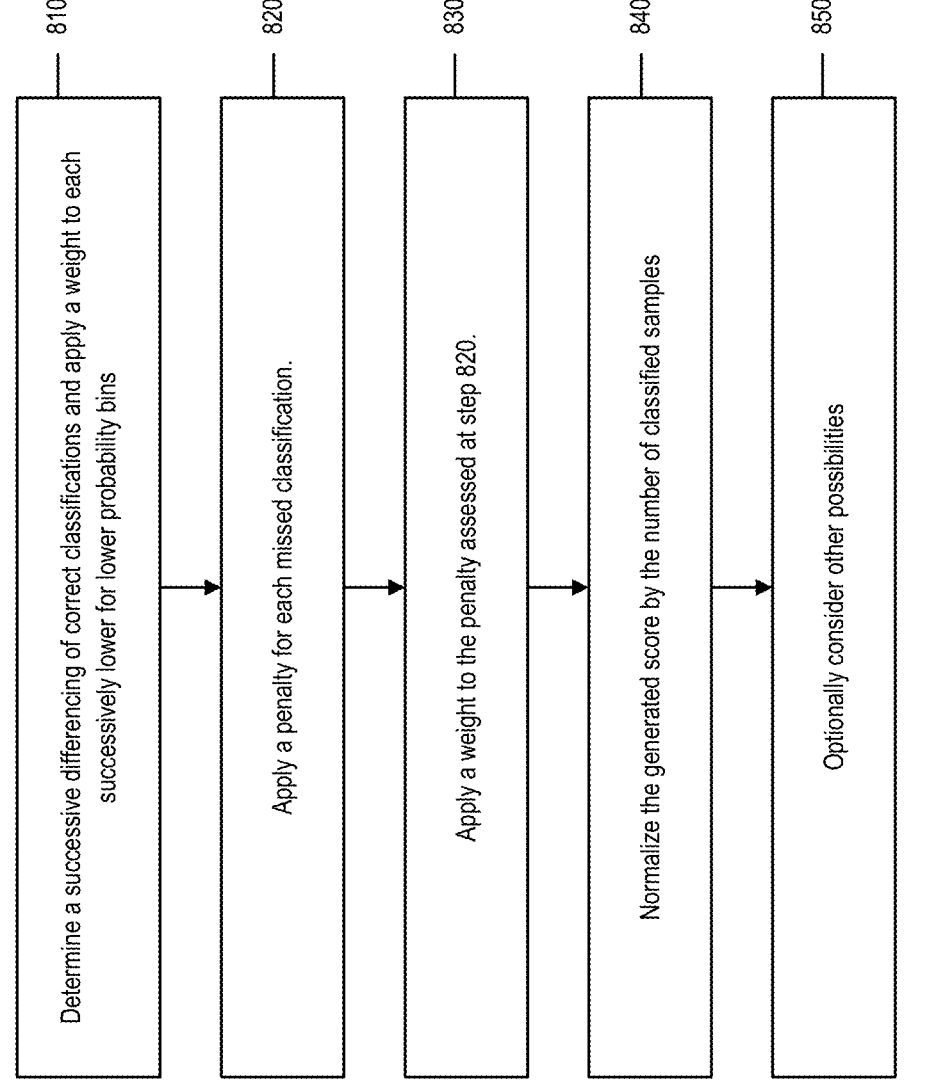
FIG. 8 illustrates a process or method for determination of model fitness and stability, in accordance with an embodiment.

FIG. 8 illustrates a process or method for determination of model fitness and stability, in accordance with an embodiment.

As illustrated in FIG. 8, in accordance with an embodiment, a score can be determined for a given model for a dataset. As the model generates a probabilities (e.g., a probability that an invoice will be paid or not), the model's outputs can be gathered into probability "bins"—that is, a grouping of a range of probabilities. For example, if a model's output is grouped into 10 probability bins, such bins would range from 0-0/0.1, 0.1-0.2, 0.2-0.3, 0.3-0.4, 0.4-0.5, 0.5-0.6, 0.6-0.7, 0.7-0.8, 0.8-0.9, and 0.9-1.0. By comparing the model's outputs to actual results (e.g., whether invoices were actually paid or not), the models can be examined by finding a number of correct and incorrect classifications for each probability bin.

In accordance with an embodiment, it should be noted that while the examples discussed and shown in the instant application utilize 10 probability bins to demonstrate the scoring process described herein, more or fewer probability bins can be utilized (e.g., 100 probability bins where each probability bin cover a 0.01 range in probability).

In accordance with an embodiment, at step 810, the scoring process can determine a successive differencing of correct classifications and apply a weight to each successively lower for lower probability bins. The weights applied for each probability bin can be automatically generated and can, for example, weigh bins with a high probability more as higher importance is placed for a model be correct when the model projects a result with high probability.

In accordance with an embodiment, at step 820, the scoring process can then apply a penalty for each missed classification.

In accordance with an embodiment, at step 830, the scoring process can apply a weight to the penalty assessed at step 820 for each probability bin. The weight can, like in step 810, be higher, even exponentially higher, for bins with high probability. Such as penalty weight can likewise be automatically generated. A higher penalty is applied to missed classifications for higher probability bins as misclassifications in high probability bins should similarly reduce a score more than for a missed classification in a low probability bin.

In accordance with an embodiment, at step 840, the scoring process can normalize the generated score by the number of classified samples. That is, for example, the normalizing can be dividing the generated score by the number of samples.

In accordance with an embodiment, at step 850, the scoring process can optionally consider other possibilities consider by, e.g., Monte Carlo simulations, and filter out poor scoring techniques.

Deployability Score and Deployability Flag

As described herein, in accordance with an embodiment, the system comprises a model fitness and stability component which can provide one or more features that support use of a model deployability score and deployability flag, to determine model fitness and stability for a particular application.

In accordance with an embodiment, the below approach can be used to determine a Deployability Score and Deployability Flag:

Deployability Score$(\psi)=$ (Equation 2)

$$\frac{Mn}{\left(1+e^{-2\omega\lambda}\right)} + \frac{\lambda}{n\left(1+e^{-2\omega\lambda}\right)} \approx nMH(\lambda) + \lambda H(\lambda)/n,$$

Wherein a system programmed according to the above (Equation 2) considers:

Probability Bins Score $(\lambda) =$ $$\frac{\displaystyle\sum_{x=\lceil np\rceil+1}^{n}(C_x - C_{x-1} - NC_x)nx\left(1 + \frac{m}{n\log(n)}\right)^{x-n} - \sum_{x=1}^{\lceil np\rceil}(C_x - C_{x-1} - NC_x)x}{\displaystyle\sum_{x=1}^{n}(AC_x)}$$

$H(\lambda)$=Heaviside Step Function (used to drastically save computational time) which is an integral of the Dirac Delta function $$H(x) = \int_{-\infty}^{x} \delta(s)ds.$$

$M$=Matthews' Correlation Coefficient (MCC) defined below in (Equation 5).
$\omega$=Sharpness of Decision Boundary.
$n$=(=10 by default) Relative Scale Between Matthews' Correlation Coefficient and $\lambda$.

In accordance with an embodiment, the Deployability Score $(\psi)$ is on Scale of $-10$ to $+10$: For perfect classification, $\psi$ will be above 10, for perfectly incorrect classification, $\psi$ will be below $-10$.

In accordance with an embodiment, the model Deployability Flag can be defined as follows based on Heaviside step function:

(Equation 3)

Deployability Flag =

$$\frac{1}{1 + e^{-2\omega\left(\left(\frac{Mn}{(1+e^{-2\omega\lambda})} + \frac{\lambda}{n(1+e^{-2\omega\lambda})}\right) - \tau\right)}} \approx H(\psi - \tau)$$

Wherein a system programmed according to the above (Equation 3) considers:
$\tau$=(=5 by Default) Deployment Threshold.
   $\psi$=Deployability Score from (Equation 2).
   $\psi-\tau$=How much better is the model compared to the Deployability Score.
   $H(\psi-\tau$=Heaviside Step Function on $\psi$-T.

In accordance with an embodiment, the Deployability Score can be implemented as follows:

The system can use a Matthews Correlation Coefficient (MCC), as illustrated by (Equation 5) below, as proxy for all other measures of correct classification as Precision, Recall, Accuracy, F1-score are all accounted for by MCC.

The Probability Bins Score is a model hygiene prerequisite, and adds to overall deployability once a base threshold has been crossed.

After basic hygiene factors have been crossed, the Deployability Score is highly correlated with MCC, and improves with Probability Bins Score.

After the Deployability Score crosses a threshold above in (Equation 3), the system can consider the model deployable.

For initial model deployments, the system can determine that the Deployability Score>$\tau$ above.

Deployability Flag for New Models=($H$
   $(\psi_{human\_deploy}-(\tau-1))$ or $H(\psi_{human\_deploy}-(\tau+1))$ In accordance with an embodiment, for checking deployability of new models that follow from the original one, as long as the new model continues to have a Deployability Score>$\tau$ and no worse than within 1 of the *original* Deployability Score when a human determination was made, the system can deploy. This will approximately correspond to a shift of no more than 0.1 in MCC, F1 Score and Area Under the Curve of the Receiver Operator Characteristic (AUC of ROC).

In accordance with an embodiment, a second class of well-known metrics can be used to determine how well the classes have been distinguished as determined by relative counts of True Positives (TP), False Positives (FP), True Negatives (TN) and False Negatives (FN), such as the F1 Score where Type I and Type II errors are equally weighted.

In accordance with an embodiment, the described approach allows customers to choose to weight recall vs precision, where if customers want more recall than precision, then they can set $\beta$ to be greater than 1 and if they prefer higher precision over recall then can set $\beta$ as smaller than 1 in:

$$F_\beta = \frac{(1+\beta^2)\cdot TP}{(1+\beta^2)\cdot TP + \beta^2 \cdot FN + FP}$$

However, these F measures and related measures are skewed due to class imbalance, especially where the actual class of interest, such as cases of non-payment may be rare vis-à-vis cases of completed payments. To resolve this problem of class imbalance, the system can filter models through Matthews Correlation Coefficient (MCC)

(Equation 5)

Matthews Correlation Coefficient =

$$\frac{TP\cdot TN - FP\cdot FN}{\sqrt{(TP+FP)(TP+FN)(TN+FP)(TN+FN)}}$$

The above determination is close to 1 for perfect correct classification, close to $-1$ for incorrect classification, and close to 0 for random classification. In accordance with an embodiment, models exceeding an MCC of 0.5 can be accepted when it meets the score above. The Matthews Correlation Coefficient extends well to multi-class classification cases as well.

Mitigation of Model Drift Risk

As described above, in accordance with an embodiment, the system comprises a model fitness and stability component which can provide one or more features that support mitigation of model drift risk, to determine model fitness and stability for a particular application.

In accordance with an embodiment, model drift risk can be mitigated along with model stability detection. While model accuracy metrics can vary wildly depending the training and test distribution drifts, the systems and methods do not use merely model accuracy metrics as criteria for model selection. As input distributions or the distribution of the sample of the population taken on specific days or weeks changes, it is expected to see significant drifts in the decision boundaries in newer models, even to the extent of reversing classifications on multiple instances such classifying an invoice as likely to be not paid today when it was classified likely to be paid yesterday.

In accordance with an embodiment, while the systems and methods should expect changes in predictions as new data comes in about the same invoices, it should not be expected to see significant changes in predictions for the same invoice if the independent variables remain substantially the same compared to previous time periods.

In accordance with an embodiment, however, if there are significant shifts in the training distributions over time, then there is a possibility of decision boundary shifts occurring. These shifts can be explicitly detected and called out to the end user. For example, when the two distributions diverge from each other substantially enough that their measures of central tendency and variance are statistically significantly different.

In accordance with an embodiment, if the systems detect that models are unstable enough to have decision boundaries drift substantially (e.g., daily), that indicates multiple problems in the model fit. In such cases, the decisions on classifications will keep changing on a daily basis to the point of flipping previous day's predictions without change in the data for individual instances.

In accordance with an embodiment, the approach described herein can be used to evaluate model stability using a sensitivity metric such that if random minor perturbations are made (under 5% of the standard deviation in independent variables) in some of the class instances of interest, and a significant shift is detected in classification, then it can be concluded that a model instability scenario has been reached, or the systems and methods may be dealing with instances which are close to the decision boundary. The system can distinguish between instances close to the decision boundary versus cases internal to the cluster of instances in a given classification using a normalized distance measure.

In accordance with an embodiment, as the change in classification probability takes a large jump, even for instances close to the centroids of the class clusters, it is expected to see instability.

In accordance with an embodiment, the systems and methods can determined and examine how far scoring distributions have shifted from the training distributions, and how far is the shift between training distributions over time. For this purpose, the described approach can use a combination of two scores:

Model and Distribution Drift: In accordance with an embodiment, reduction in F1 Score (a measure of accuracy) and Matthews Correlation Coefficient (MCC) is a direct indication of drift, and whenever a F1 score falls below a threshold (e.g., 0.6), or MCC is below a boundary (e.g., 0.35(the system can automatically raise an alarm flag to require retraining of model. Evaluating Kullback-Leibler Divergence or Bhattacharya distance type of measures to determine shift in distribution of input independent variables from training to scoring datasets can determine how far the input distribution has drifted from the training data of the past.

Model Stability: In accordance with an embodiment, the described approach can be used to provide a scoring mechanism for change in classification despite negligible change in input independent variables.

FIG. 9 further illustrates a process or method for determination of model fitness and stability, in accordance with an embodiment.

As illustrated in FIG. 9, in accordance with an embodiment, a process can be utilized to determine if a model is drifting and is in need of mitigation. The process can also be used to determine a risk to model stability.

For example, the process of FIG. 9 can be used to determined when a model is shifting/flipping predictions (e.g., flipping a number of predictions from "paid" to "not paid" from one day to the next—this could be a sign of model instability or degradation).

In accordance with an embodiment, at step 910, the process can detect one or more signals of model degradation under distribution drift. For example, the process can track MCC and AUC scores to determine whether the scores ad dropping. A loss in more than a threshold can be considered to show that a model is drifting, or in major drift (e.g., a threshold of a loss of 0.1 or more. Additionally, the process can evaluate Kullback-Leibler Divergence (a/k/a Relative Entropy) or Bhattacharya Distance type of measures to determine shift in distribution of input independent variables from training to scoring datasets.

In accordance with an embodiment, at step 920, the process can begin a model stability and detection and scoring process.

In accordance with an embodiment, at step 930, the process can determine a distance of each instance (e.g., an invoice) from a cluster of its nearest neighbors (e.g., thirty neighbors) with a same prior classification. The distance can be calculated by, e.g., finding a Mahalanobis distance of each invoice or instance from the cluster of its nearest thirty neighbors with the same prior classification.

In accordance with an embodiment, at step 940, where the process determines that at least one or more of these nearest neighbors flip classification in a newer version of the model, the process can add this to the count of flipped classifications.

In accordance with an embodiment, at step 950, the process can determine a percentage or ratio of such flipped classifications out of the total number of instances being classified.

In accordance with an embodiment, at step 960, if such flipped classifications exceed a threshold (e.g., 2 percent of the total number of instances without a corresponding increase in MCC), then the process can flag the model as being marginally unstable.

In accordance with an embodiment, at step 970, if such flipped classifications exceed a second threshold (e.g., 10% of the total number of instances without a corresponding increase in MCC), then the process flag the model as unstable.

In accordance with an embodiment, the thresholds discussed above can be set, modified, and/or changed based upon an input received at the system, such as by a user or an administrator.

In accordance with an embodiment, the described approach uses a Mahalanobis distance based measure of standard deviation normalized distance between invoices or instances by converting all numerical independent variables (e.g. amount, # of delinquency days, # of follow-ups done) to a z-score, and converting all categorical independent variables (e.g. customer industry, location, invoice type, invoice item type) to an entropy encoded renormalized z-score, and then finding the Euclidean distance (if the covariance matrix is an identity matrix) between the current invoice and clusters of different invoice types or customers types.

For example, in accordance with an embodiment, if the invoice distance from paid invoices is higher than from unpaid invoices, then the process can assign it a high-risk category. As illustrated in FIG. 10, the system can present a sorted list of invoices to the user by risk.

FIG. 10 is an illustration of a sorted list of invoices, in accordance with an embodiment.

As illustrated in FIG. 10, an exemplary screenshot 1000 can be provided, e.g., via a user interface of the system. Based upon the model that was selected due to the scoring systems described above, various metrics can be provided via the user interface. These include, but are not limited to, top 10 invoices at risk along with amounts, top 10 invoices paid along with amounts, a total amount of risk with the top 20% of invoices, the total amount to be paid with the top 20% of invoices.

FIG. 11 is an illustration of outputs of a model to analyze data, in accordance with an embodiment.

As illustrated in FIG. 11, an exemplary screenshot 1100 can be provided, e.g., via a user interface of the system. Based upon the model that was selected due to the scoring systems described above, various metrics can be provided via the user interface related to probability bins. The system can generate such a chart by creating equal bins of probability intervals, and then creating a correlation (e.g., Pearson's correlations) with the bins column for all numerical variables. A top number of correlated variables (e.g., 5) can then be determined.

After such determination, in accordance with an embodiment, the system can determine whether the bin-mean of these variables is at least a percentage (e.g., 50%) different from the entire population's average. If the bin-mean is at least, e.g., 50% different from the population mean, this variable can be displayed along with a list of explanations.

FIG. 12 is a flowchart of a method for determination of model fitness and stability for model deployment in automated model generation, in accordance with an embodiment.

In accordance with an embodiment, at step 1210, the method can provide a computer comprising one or more microprocessors, and a data analytics, cloud, or other computing environment operating thereon.

In accordance with an embodiment, at step 1220, the method can provide, at the data analytics cloud, a plurality of models.

In accordance with an embodiment, at step 1230, the method can, based upon a set of data at the data analytics cloud, score a set of the plurality of models.

In accordance with an embodiment, at step 1240, the method can select, based upon the scoring, a model of the set of the plurality of models.

In accordance with an embodiment, at step 1220, the method can monitor the model for indications of instability or drift.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate use with cloud environments such as Oracle Analytics Cloud; in accordance with various embodiments, the systems and methods described herein can be used with other types of enterprise software applications, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for determination of model fitness and stability for model deployment in automated model generation, comprising:

a computer comprising one or more microprocessors, and a data analytics environment operating thereon;

wherein the data analytics environment operating on the computer includes one or more software components operating as a data plane, and providing access to one or more data warehouse instances;

wherein the data plane includes a data pipeline or process that maintains, for each of a plurality of tenants, a data analytics schema that is updated on a periodic basis by the system;

wherein the data plane includes a data transformation layer that the system uses to transform transactional data into a model format understood by the data analytics environment; and wherein the data analytics environment provides, for each tenant of the plurality of tenants, a customer schema which allows the tenant to supplement and utilize data within their own data warehouse instance, so that their resultant data warehouse instance operates as a database whose contents are partly-controlled by the tenant, and partly-controlled by the data analytics environment;

wherein the computer comprising one or microprocessors operates to:

provide, at the data analytics environment operating on the computer, a model fitness and stability component and a plurality of data models; and based upon a set of data at the data analytics environment, score a set of the plurality of data models, wherein scoring each data model within the set comprises:

automatically assigning predictions of the data model to probability bins, and determining a successive differencing of correct classifications between successive probability bins, for use in determining a probability bins score;

select, based upon the scoring, a selected data model from within the set of the plurality of models; and monitor the selected data model for indications of instability or drift.

2. The system of claim 1, wherein scoring the set of the plurality of models comprises, for each of the set of the plurality of models:

applying a weight to each successive differencing of correct classifications between successive probability bins;

wherein the weight applied to each successive difference of correct classifications depends upon the probability bin to which the weight is applied.

3. The system of claim 2, wherein the weight is larger for bins of higher probability.

4. The system of claim 3, wherein scoring the set of the plurality of models further comprises, for each of the set of the plurality of models:

applying a penalty for each missed classification for each probability bin;

applying a penalty weight to each applied penalty for each missed classification.

5. The system of claim 4, wherein the penalty weight is larger for bins of higher probability.

6. The system of claim 5, wherein scoring the set of the plurality of models further comprises, for each of the set of the plurality of models:

normalizing a generated score by a number of classified samples.

7. The system of claim 1, wherein monitoring the model for indications of instability or drift comprises:

detecting one or more signals of model degradation;

determining a distance of each instance generated by the model to a cluster of instances having a same prior classification;

determining that at least one or more of the nearest neighbors have flipped classification in a new version of the model;

determining a percentage of such flipped classification out of a total number of instances generated by the model;

upon said determined percentage exceeding a first threshold value, tagging the model as marginally unstable; and upon said determined percentage exceeding a second threshold value, tagging the model as unstable.

8. A method for determination of model fitness and stability for model deployment in automated model generation, comprising:

providing a computer comprising one or more microprocessors, and a data analytics environment operating thereon;

wherein the data analytics environment operating on the computer includes one or more software components operating as a data plane, and providing access to one or more data warehouse instances;

wherein the data plane includes a data pipeline or process that maintains, for each of a plurality of tenants, a data analytics schema that is updated on a periodic basis by the system;

wherein the data plane includes a data transformation layer that the system uses to transform transactional data into a model format understood by the data analytics environment; and wherein the data analytics environment provides, for each tenant of the plurality of tenants, a customer schema which allows the tenant to supplement and utilize data within their own data warehouse instance, so that their resultant data warehouse instance operates as a database whose contents are partly-controlled by the tenant, and partly-controlled by the data analytics environment;

providing, at the data analytics environment operating on the computer, a model fitness and stability component and a plurality of models;

based upon a set of data at the data analytics environment, scoring a set of the plurality of data models, wherein scoring each data model within the set comprises:

automatically assigning predictions of the data model to probability bins, and determining a successive differencing of correct classifications between successive probability bins, for use in determining a probability bins score;

selecting, based upon the scoring, a selected data model from within the set of the plurality of models; and monitoring the selected data model for indications of instability or drift.

9. The method of claim 8, wherein scoring the set of the plurality of models comprises, for each of the set of the plurality of models:

applying a weight to each successive differencing of correct classifications between successive probability bins;

wherein the weight applied to each successive difference of correct classifications depends upon the probability bin to which the weight is applied.

10. The method of claim 9, wherein the weight is larger for bins of higher probability.

11. The method of claim 10, wherein scoring the set of the plurality of models further comprises, for each of the set of the plurality of models:

applying a penalty for each missed classification for each probability bin;

applying a penalty weight to each applied penalty for each missed classification.

12. The method of claim 11, wherein the penalty weight is larger for bins of higher probability.

13. The method of claim 12, wherein scoring the set of the plurality of models further comprises, for each of the set of the plurality of models:

normalizing a generated score by a number of classified samples.

14. The method of claim 8, wherein monitoring the model for indications of instability or drift comprises:

detecting one or more signals of model degradation;

determining a distance of each instance generated by the model to a cluster of instances having a same prior classification;

determining that at least one or more of the nearest neighbors have flipped classification in a new version of the model;

determining a percentage of such flipped classification out of a total number of instances generated by the model;

upon said determined percentage exceeding a first threshold value, tagging the model as marginally unstable; and upon said determined percentage exceeding a second threshold value, tagging the model as unstable.

15. A non-transitory computer readable storage medium, including instructions stored thereon which when read and executed by one or more computers cause the one or more computers to perform a method comprising:

providing, at a computer comprising one or more microprocessors, a data analytics environment operating thereon;

wherein the data analytics environment operating on the computer includes one or more software components operating as a data plane, and providing access to one or more data warehouse instances;

wherein the data plane includes a data pipeline or process that maintains, for each of a plurality of tenants, a data analytics schema that is updated on a periodic basis by the system;

wherein the data plane includes a data transformation layer that the system uses to transform transactional data into a model format understood by the data analytics environment; and wherein the data analytics environment provides, for each tenant of the plurality of tenants, a customer schema which allows the tenant to supplement and utilize data within their own data warehouse instance, so that their resultant data warehouse instance operates as a database whose contents are partly-controlled by the tenant, and partly-controlled by the data analytics environment;

providing, at the data analytics environment operating on the computer, a model fitness and stability component and a plurality of models;

based upon a set of data at the data analytics environment, scoring a set of the plurality of data models, wherein scoring each data model within the set comprises:

automatically assigning predictions of the data model to probability bins, and determining a successive differencing of correct classifications between successive probability bins, for use in determining a probability bins score;

selecting, based upon the scoring, a selected data model from within the set of the plurality of models; and monitoring the selected data model for indications of instability or drift.

16. The non-transitory computer readable storage medium of claim 15, wherein scoring the set of the plurality of models comprises, for each of the set of the plurality of models:

applying a weight to each successive differencing of correct classifications between successive probability bins;

wherein the weight applied to each successive difference of correct classifications depends upon the probability bin to which the weight is applied.

17. The non-transitory computer readable storage medium of claim 16, wherein the weight is larger for bins of higher probability.

18. The non-transitory computer readable storage medium of claim 17, wherein scoring the set of the plurality of models further comprises, for each of the set of the plurality of models:

applying a penalty for each missed classification for each probability bin;

applying a penalty weight to each applied penalty for each missed classification;

wherein the penalty weight is larger for bins of higher probability.

19. The non-transitory computer readable storage medium of claim 18, wherein scoring the set of the plurality of models further comprises, for each of the set of the plurality of models:

normalizing a generated score by a number of classified samples.

20. The non-transitory computer readable storage medium of claim 15, wherein monitoring the model for indications of instability or drift comprises:

detecting one or more signals of model degradation;

determining a distance of each instance generated by the model to a cluster of instances having a same prior classification;

determining that at least one or more of the nearest neighbors have flipped classification in a new version of the model;

determining a percentage of such flipped classification out of a total number of instances generated by the model;

upon said determined percentage exceeding a first threshold value, tagging the model as marginally unstable; and upon said determined percentage exceeding a second threshold value, tagging the model as unstable.

* * * * *